(12) United States Patent
Nakano (10) Patent No.: US 9,293,983 B2
(45) Date of Patent: Mar. 22, 2016

(54) SWITCHING POWER-SUPPLY APPARATUS

(71) Applicant: Sanken Electric Co., LTD., Niiza-shi, Saitama (JP)

(72) Inventor: Toshihiro Nakano, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 116 days.

(21) Appl. No.: 14/135,834

(22) Filed: Dec. 20, 2013

(65) Prior Publication Data

US 2014/0177284 A1  Jun. 26, 2014

(30) Foreign Application Priority Data

Dec. 21, 2012  (JP) ................................. 2012-279100

(51) Int. Cl.
| | |
|---|---|
| *H02M 7/5375* | (2006.01) |
| *H02M 1/36* | (2007.01) |
| *H02M 3/335* | (2006.01) |
| *H02M 1/00* | (2007.01) |

(52) U.S. Cl.
CPC ........ *H02M 1/36* (2013.01); *H02M 2001/0006* (2013.01)

(58) Field of Classification Search
CPC ... H02M 1/36; H02M 3/335; H02M 3/33507; H02M 7/517; H02M 7/5375
USPC ............................. 363/21.16, 49, 97; 323/901
See application file for complete search history.

(56) References Cited

U.S. PATENT DOCUMENTS

| | | | |
|---|---|---|---|
| 5,391,428 A | 2/1995 | Zender | |
| 7,525,819 B2* | 4/2009 | Choi | ................................ 363/16 |
| 2006/0039524 A1 | 2/2006 | Feinroth et al. | |
| 2012/0025608 A1* | 2/2012 | Melanson et al. | .............. 307/24 |
| 2012/0307530 A1* | 12/2012 | Miyazaki | .................... 363/21.01 |
| 2013/0021013 A1* | 1/2013 | Kondou | ......................... 323/283 |

FOREIGN PATENT DOCUMENTS

JP   2003-333840 A   11/2003

* cited by examiner

*Primary Examiner* — Gary L Laxton
(74) *Attorney, Agent, or Firm* — Banner & Witcoff, Ltd.

(57) ABSTRACT

A switching power-supply apparatus includes: a control circuit that controls on-and-off switching of a switching element; a first rectifying-and-smoothing circuit that smoothes a voltage generated in a secondary winding; and a second rectifying-and-smoothing circuit that smoothes a voltage generated in a tertiary winding as a power supply voltage, a starting circuit that supplies as a starting current: a first constant current to the control circuit when the power supply voltage is equal to or lower than a first threshold voltage, which is lower than a starting voltage of the control circuit; a second constant current, which is greater than the first constant current, to the control circuit when the power supply voltage is larger than the first threshold voltage and is equal to or lower than the starting voltage; and the first constant current to the control circuit while the control circuit is started up.

4 Claims, 8 Drawing Sheets

SWITCHING POWER-SUPPLY APPARATUS

CROSS-REFERENCE TO RELATED APPLICATION

This application claims priority from Japanese Patent Application No. 2012-279100 filed on Dec. 21, 2012, the entire subject matter of which is incorporated herein by reference.

TECHNICAL FIELD

This disclosure relates to a switching power-supply apparatus of performing power conversion by a switching operation of turning on-and-off a switching element and more specifically to a switching power-supply apparatus in which a starting circuit of supplying a starting current to a control circuit controlling a switching operation includes a constant current circuit.

BACKGROUND

In a background switching power-supply apparatus, a starting circuit, which supplies a starting current to a control circuit controlling a switching operation when a DC power source is turned on, includes a constant current circuit (for example, see JP-A-2003-333840).

Figure 6:
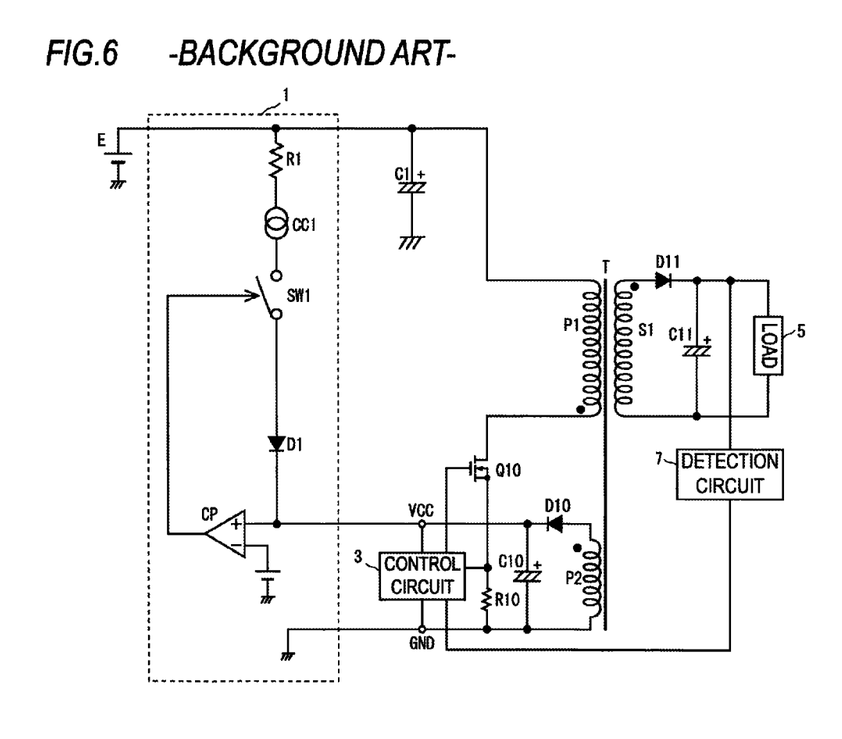
FIG. 6 is a circuit diagram illustrating a circuit configuration of a switching power-supply apparatus according to a background art.

As shown in FIG. 6, the background switching power-supply apparatus includes a capacitor C1, a starting circuit 1, a transformer T having a primary winding P1, a secondary winding S1 and a tertiary winding P2, a switching element Q10 configured by MOSFET, for example, a resistor R10 detecting a current flowing through the switching element Q10, a control circuit 3 for controlling on-and-off switching of the switching element Q10, a first rectifying-and-smoothing circuit including a capacitor C11 and a diode D11, a second rectifying-and-smoothing circuit including a capacitor C10 and a diode D10, and a detection circuit 7.

The capacitor C1 equivalently represents a capacitor that is provided to an input of a switching power supply, for example, a smoothing capacitor or the like in the case of rectifying-and-smoothing an AC power source to input to the switching power supply. Even when the DC power source E that is input to the switching power supply is cut off, voltage does not drop to zero immediately due to the capacitor C1. The starting circuit 1 is connected between a connection point of a positive terminal of the capacitor C1 with one end of the primary winding P1 of the transformer T and a power input terminal VCC of the control circuit 3, and the DC power source E is intermittently or constantly applied to the starting circuit 1. The control circuit 3 is started at a starting voltage Von (18V, for example) and is stopped at a stop voltage Voff (9V, for example). The control circuit 3 controls an output voltage as a predetermined voltage by turning on-and-off of the switching element Q10, based on an output voltage Vout detected by the detection circuit 7.

The starting circuit 1 is provided with a series circuit including a resistor R1, a constant current circuit CC1, a switch SW1 and a diode D1, and a comparator CP. The series circuit including the resistor R1, constant current circuit CC1, switch SW1 and a diode D1 is connected between the connection point of the positive terminal of the capacitor C1 with one end of the primary winding P1 of the transformer T and the power input terminal VCC of the control circuit 3. In the comparator CP, a non-inverting input terminal is connected to the connection point between the cathode of the diode D1 and the power input terminal VCC of the control circuit 3, and an inverting input terminal is connected to a reference power supply Vr1. The output terminal of the comparator CP is connected to a contact point of the switch SW1. The comparator CP has a hysteresis characteristic, and it outputs an H-level when the non-inverting input terminal becomes the starting voltage Von (18V, for example) of the control circuit 3 and outputs an L-level when the non-inverting input terminal becomes the stop voltage Voff (9V, for example) of the control circuit 3.

An operation of the switching power supply configured as described above will be described with reference to FIG. 7.

Figure 7:
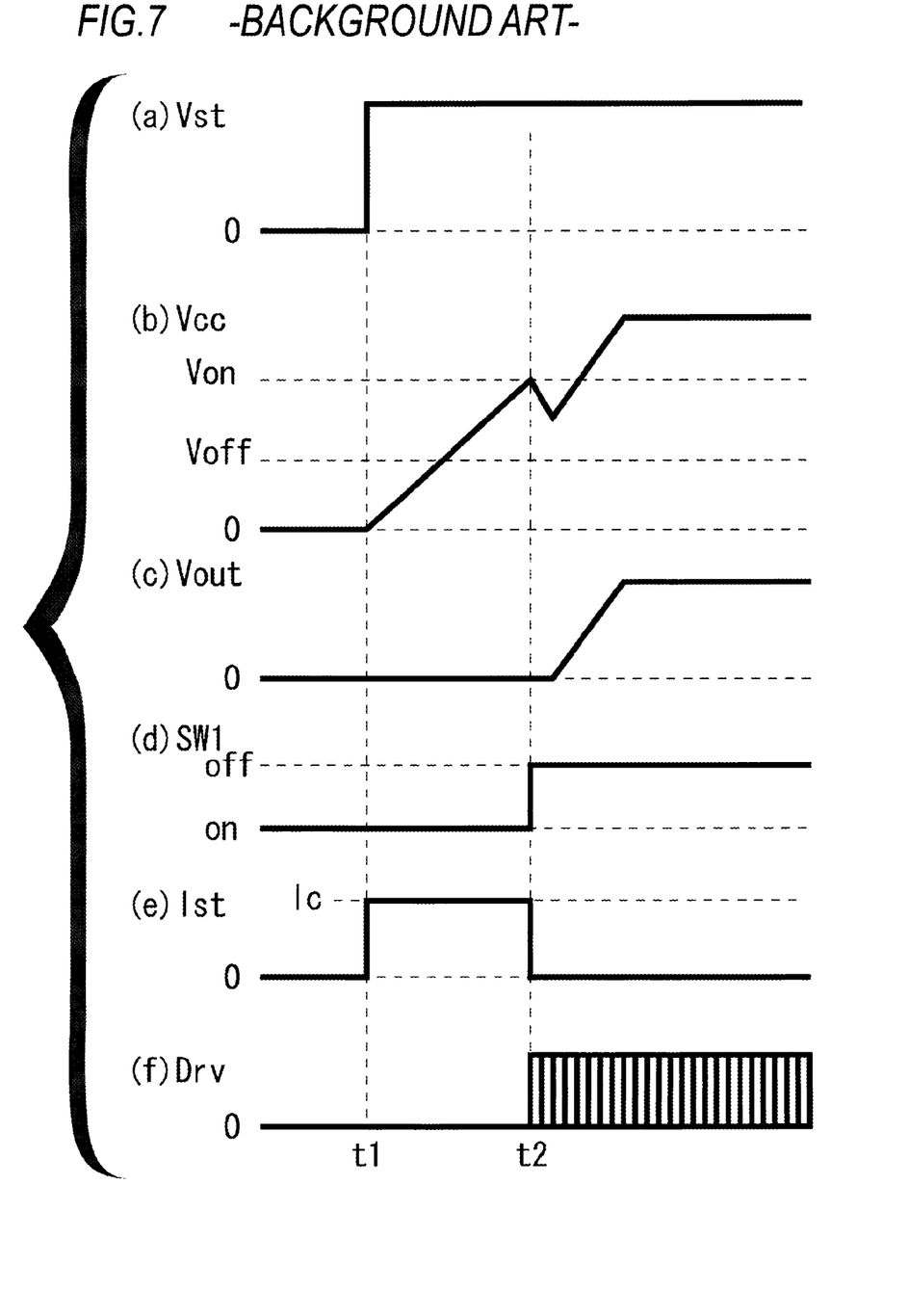
FIG. 7 is a waveform diagram illustrating signal waveforms and operation waveforms (a) to (f) with respect to respective parts of the FIG. 6.

First, when the DC power source E is input at time point t1, in the starting circuit 1, the input voltage Vst is applied to the constant current circuit CC1 via the resistor R1. At this time, since the output of the comparator CP is at the L-level, the switch SW1 is in a state of having been turned on. Thus, a predetermined constant current Ic (2.5 mA for example) flows as the starting current Ist by the constant current circuit CC1, the capacitor C10 is charged through the diode D1, and thereby the voltage of the capacitor C10 rises. The voltage of the capacitor C10 is supplied to the power input terminal VCC of the control circuit 3 thereby becoming a power-supply voltage Vcc of the control circuit 3.

First, since the power-supply voltage Vcc is lower than the starting voltage Von of the control circuit 3, the output of the comparator CP is at the L level, and the switch SW1 is continued in an ON-state. When the power-supply voltage Vcc reaches the starting voltage Von at time point t2, the control circuit 3 is started. When the control circuit 3 is started, the drive signal Dry is transmitted from the control circuit 3, and then the switching element Q10 starts to turn on-and-off. Therefore, the DC power source E is intermittently applied to the primary winding P1 of the transformer T, and a voltage is induced in the secondary winding S1. The voltage generated in the secondary winding S1 is rectified and smoothed in the diode D11 and capacitor C11, and the output voltage Vout is supplied to the load 5. The output voltage Vout supplied to the load 5 is compared with a reference voltage in the detection circuit 7, and an error signal is input to the control circuit 3. The control circuit 3 generates the drive signal Dry of duty based on the error signal, thereby turning on-and-off the switching element Q10.

Further, at timing when the power-supply voltage Vcc becomes the starting voltage Von at time point t2, the output of the comparator CP becomes from the L-level to the H-level, and the switch SW1 is turned off. Thus, charging of the capacitor C10 by the starting circuit 1 is stopped. Then, the DC voltage, which is obtained by rectifying-and-smoothing the voltage generated in the tertiary winding P2 of the transformer T by the diode D10 and capacitor C10, is supplied to the control circuit 3.

SUMMARY

However, in recent years, a small capacity of the capacitor C10 supplying the power-supply voltage Vcc is used for a speed up of starting of the control circuit 3 and for reducing low cost. In the case of using the small capacity of the capacitor C10 in a background art, there is a possibility that it may cause a failure of the start-up thereof. That is, in the background art, when the power-supply voltage Vcc becomes the starting voltage Von, charging of the capacitor C10 by the starting circuit 1 is stopped. Accordingly, the capacitor C10 is not charged up to a voltage generated in the tertiary winding P2 of the transformer T. Therefore, in the case of using the small capacity of the capacitor C10, there is a problem that the power-supply voltage Vcc may drop rapidly in response to the start-up of the control circuit 3 to be lower than the stop voltage Voff of the control circuit 3, thereby causing the start-up failure. In this case, the starting and stopping of the control circuit 3 is repeated.

This disclosure provides at least a switching power-supply apparatus capable of using a small capacity of a capacitor supplying a power supply voltage without causing a start-up failure.

A switching power-supply apparatus of this disclosure, comprises: a switching element that is configured to be connected to a DC power source via a primary winding of a transformer; a control circuit that controls on-and-off switching of the switching element; a first rectifying-and-smoothing circuit that rectifies and smoothes a voltage generated in a secondary winding of the transformer and supply it to a load; and a second rectifying-and-smoothing circuit that rectifies and smoothes a voltage generated in a tertiary winding of the transformer and supply it to the control circuit as a power supply voltage, a starting circuit that supplies: a first constant current to the control circuit when the power supply voltage is equal to or lower than a first threshold voltage, which is lower than a starting voltage of the control circuit, as a starting current; a second constant current, which is greater than the first constant current, to the control circuit when the power supply voltage is larger than the first threshold voltage and is equal to or lower than the starting voltage, as the starting current; and the first constant current to the control circuit while the control circuit is started up, as the starting current.

In one aspect of this disclosure, the first threshold voltage is set to be lower than a stop voltage of the control circuit.

In one aspect of this disclosure, when the power supply voltage is larger than a second threshold voltage higher than a starting voltage of the control circuit, the starting circuit reduces the first constant current as the power supply voltage increases.

Meanwhile, a starting circuit of this disclosure is provided in a switching power-supply apparatus and supplying a starting current to a control circuit when a DC power source is turned on, the starting circuit comprising a switching element that is configured to be connected to a DC power source via a primary winding of a transformer; a control circuit that controls on-and-off switching of the switching element; a first rectifying-and-smoothing circuit that rectifies and smoothes a voltage generated in a secondary winding of the transformer and supply it to a load; and a second rectifying-and-smoothing circuit that rectifies and smoothes a voltage generated in a tertiary winding of the transformer and supply it to the control circuit as a power supply voltage. The starting circuit supplies: a first constant current to the control circuit when the power supply voltage is equal to or lower than a first threshold voltage, which is lower than a starting voltage of the control circuit, as a starting current; a second constant current, which is greater than the first constant current, to the control circuit when the power supply voltage is larger than the first threshold voltage and is equal to or lower than the starting voltage, as the starting current; and the first constant current to the control circuit while the control circuit is started up, as the starting current.

According to this disclosure, since it is possible to suppress the drop of the power supply voltage until the voltage generated in the tertiary winding of the transformer rises up to the operating voltage, it is possible to obtain a stable operating voltage, and it is possible to suppress the start-up failure even in the case of using the small capacity of the capacitor for the power supply voltage charging.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, the illustrative embodiments of this disclosure will be described in detail with reference to the accompanying drawings. In the description of the drawings, same or similar parts are referred to as same or similar reference numerals. However, the drawings are schematic, and different from actual ones. Further, there are cases where dimensional relationships or ratios may be different from each other among the drawings.

First Illustrative Embodiment

Figure 1:
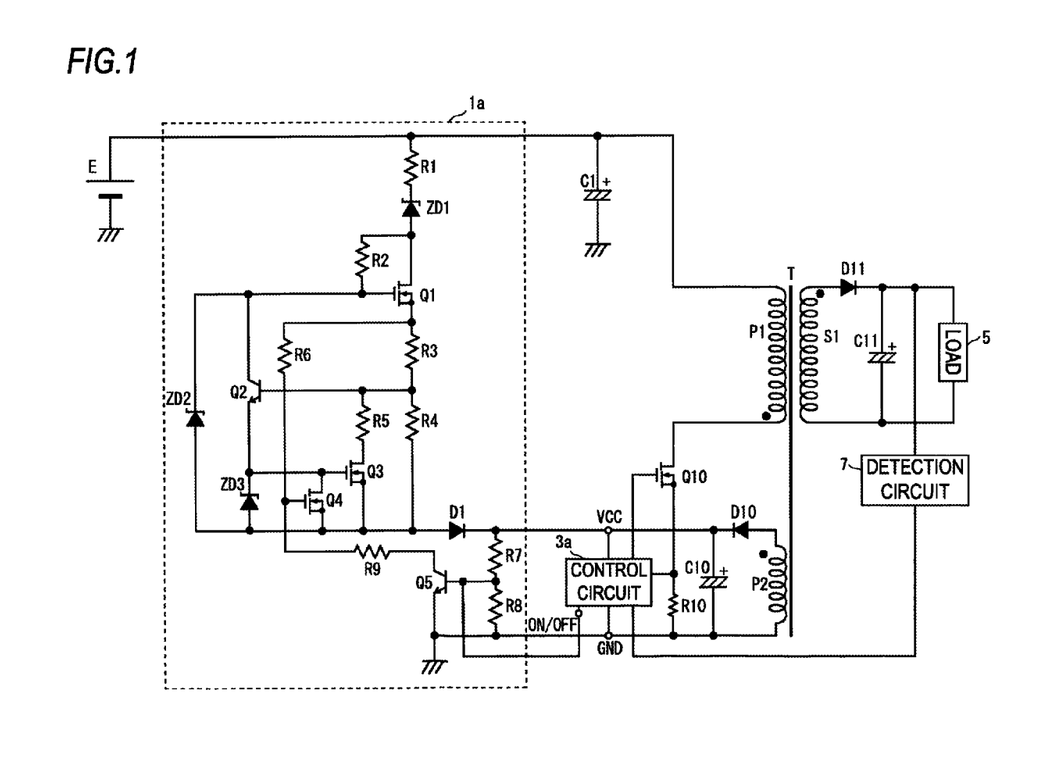
FIG. 1 is a circuit diagram illustrating a circuit configuration of a switching power-supply apparatus according to a first illustrative embodiment of this disclosure.

Referring to FIG. 1, the switching power-supply apparatus according to the first illustrative embodiment is provided with a capacitor C1, a starting circuit 1a, a transformer T having a primary winding P1, a secondary winding S1 and a tertiary winding P2, a switching element Q10 configured by a MOSFET for example, a resistor R10 detecting a current flowing through the switching element Q10, a control circuit 3 for controlling on-and-off switching of the switching element Q10, a first rectifying-and-smoothing circuit including a capacitor C11 and a diode D11, a second rectifying-and-smoothing circuit including a capacitor C10 and a diode D10, and a detection circuit 7.

Since the switching power-supply apparatus according to the first illustrative embodiment is different from that of the background switching power-supply apparatus shown in FIG. 6 in the configuration of the starting circuit 1a and the control circuit 3a, the configuration and operation of the starting circuit 1a and the control circuit 3a will be described in the following.

The starting circuit 1a is provided with resistors R1 to R9, Zener diodes ZD1 to ZD3, MOSFETs Q1, Q3, Q4, a diode D1, and transistors Q2, Q5. The series circuit including the resistor R1, the Zener diode ZD1, the MOSFET Q1, the resistor R3, the resistor R4 and the diode D1 is connected between the connection point of the positive terminal of the capacitor C1 with one end of the primary winding P1 of the transformer T and the power input terminal VCC of the control circuit 3a. The resistor R1 and the cathode of the Zener diode ZD1 are connected to each other, and the anode of the diode ZD1 is connected to a drain of the MOSFET Q1. The R2 resistor is connected between the drain and the gate of MOSFET Q1. Further, the Zener diode ZD2 is connected between the gate of MOSFET Q1 and the anode of the diode D1.

Further, the series circuit including the resistor R3 and the resistor R4 is connected between the source of MOSFET Q1 and the anode of the diode D1. The series circuit including the transistor Q2 and the Zener diode ZD3 is connected between the gate of MOSFET Q1 and the anode of the diode D1 so that the current flowing through the resistor R4 becomes the constant current. The base of the transistor Q2 is connected to the connection point between the resistor R3 and the resistor R4, and the emitter of the transistor Q2 is connected to the cathode of the Zener diode ZD3.

The series circuit including the MOSFET Q3 and the resistor R5 is connected to both ends of the resistor R4. The gate of the MOSFET Q3 is connected to the connection point between the ZD3 the emitter of the transistor Q2 and the cathode of the Zener diode, and the MOSFET Q4 is connected between the gate and the source of the MOSFET Q3. The gate of the MOSFET Q4 is connected to the source of the MOSFET Q1 via the resistor R6.

The series circuit including the resistor R7 and the resistor R8 is connected between the power input terminal VCC of the control circuit 3a and the ground terminal GND. The base and the emitter of the transistor Q5 are connected between the terminals of the resistor R8. The collector of the transistor Q5 is connected to the gate of MOSFET Q4 via the resistor R9.

Further, the stop signal output terminal OFF of the control circuit 3a is connected to the connection point between the base of the transistor Q5 and the resistor R8.

The MOSFETs Q1, Q4, the resistors R2, R3, R4, R6 and the transistor Q2 configures the first constant current circuit. When the source voltage of the MOSFET Q1 is applied to the gate of the MOSFET Q4 via the resistor R6, the MOSFET Q4 is turned on. When the MOSFET Q4 is turned on, the MOSFET Q3 is turned off, and then the emitter of the transistor Q2 and the anode of the diode D1 are connected to each other. Thus, the voltage drop of the resistor R4 is detected by the base-emitter of the transistor Q2, and the gate voltage of the MOSFET Q1 is operated so that the voltage drop of the resistor R4 is constant. That is, the current flowing through the resistor R4 becomes a constant current, and the above configuration becomes the first constant current circuit. At this time, the current value is defined as the constant current Ia.

When the first constant current flows, the capacitor C10 is charged through the diode D1. When the power-supply voltage Vcc (the voltage between the power input terminal VCC of the control circuit 3a and the ground terminal) is larger than the threshold voltage V1 which is set in advance, the transistor Q5 is turned on via the resistor R7 and the resistor R8. Incidentally, the first threshold voltage V1 is set to be lower than the starting voltage Von (18V, for example) of the control circuit 3a and also to be lower than the stop voltage Voff (9V, for example) of the control circuit 3a. When the transistor Q5 is turned on, the gate voltage of the MOSFET Q4 decreases through the resistor R9, and the MOSFET Q4 is turned off. When the MOSFET Q4 is turned off, the MOSFET Q3 is turned on, and thus the resistor R4 is connected in parallel to the resistor R5. Further, the voltage of the Zener diode ZD3 is increased, and the transistor Q2 detects the voltage drop of the parallel resistance of the resistor R4 and the resistor R5 through the Zener voltage of the zener diode ZD3. Thus, the current flowing through the parallel resistance of the resistor R4 and the resistor R5 becomes a constant current, and is to be a larger current value than the first constant current Ia. The second constant current value at this time is defined as the second constant current Ib. Thus, the MOSFET Q1, Q3, the resistors R2, R3, R4, R5, the transistor Q2, and the Zener diode D3 configure the second constant current circuit for supplying the second constant current Ib.

Incidentally, if the first constant current circuit and the second constant current circuit as described above would not function, the Zener diode ZD2 serves as a protective element for performing a current limit by clamping the voltage applied to the resistor R3 and the resistor R4, so that an excessive current is suppressed from flowing from the MOSFET Q1.

Figure 2:
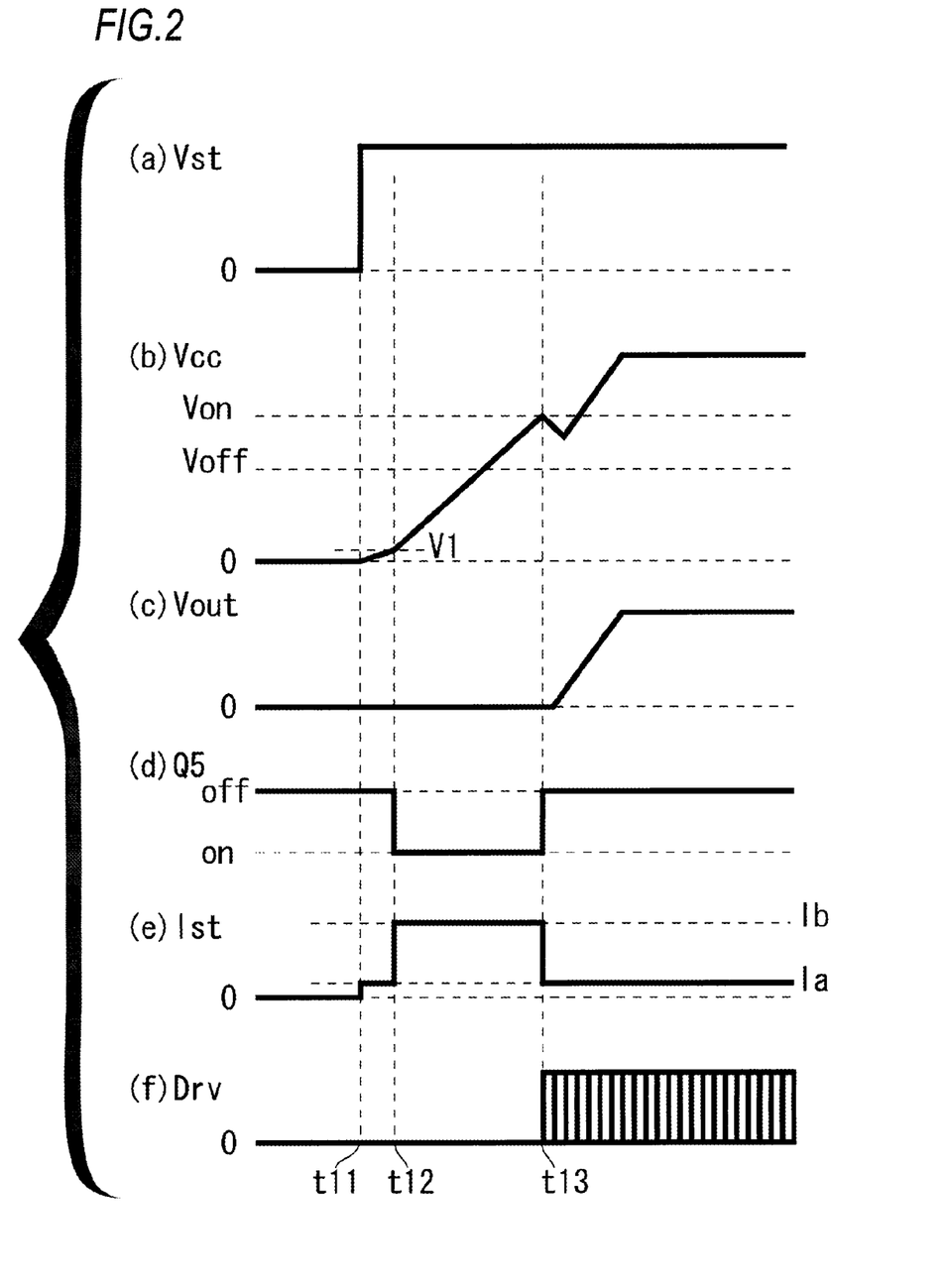
FIG. 2 is a waveform diagram illustrating signal waveforms and operation waveforms with respect to respective parts of FIG. 1.

FIG. 2 illustrates the signal waveforms and operation waveforms (a) to (f) with respect to respective parts of FIG. 1. The waveform (a) illustrates the input voltage Vst, the waveform (b) illustrates the control voltage Vcc, the waveform (c) illustrates the output voltage Vout, the waveform (d) illustrates the on-and-off state of the transistor Q5, the waveform (e) illustrates the starting current Ist, and the waveform (f) illustrates the drive signal Drv, respectively.

When the DC power source E is turned on at time point t11, the input voltage Vst to the resistor R1 from the DC power source E is increased. Thus, since the source voltage of the MOSFET Q1 is applied to the gate of MOSFET Q4 via the resistor R6 and the MOSFET Q4 is turned on, the first constant current Ia begins to flow as the starting current Ist.

When the capacitor C10 is charged by the first constant current Ia and the power-supply voltage Vcc is larger than the first threshold voltage V1 at time point t12, the transistor Q5 is turned on. When the transistor Q5 is turned on, the starting current Ist is switched to the second constant current Ib of greater than the first constant current Ia, and the capacitor C10 is charged by the second constant current Ib.

When the capacitor C10 is charged by the second constant current Ib and the power-supply voltage Vcc is larger than the starting voltage Von at time point t13, the control circuit 3a is started up. When the control circuit 3a is started up, the drive signal Dry to drive the switching element Q10 is output and the stop signal is output from the stop signal output terminal OFF, thereby turning off the transistor Q5. As a result, the starting current Ist is switched again to the first constant current Ia. That is, even after the control circuit 3a is started up, the first constant current Ia is supplied to the control circuit 3a from the starting circuit 1a. Thus, the first constant current Ia is allocated to an electric power consumed until a voltage occurs in the tertiary winding P2 of the transformer T after starting of the control circuit 3a. Accordingly, it is possible to alleviate the decrease in the power-supply voltage Vcc which is caused by the starting of the control circuit 3a. Therefore, even in the case of using the small capacity of the capacitor C10, it is possible to suppress the occurrence of starting failure.

Figure 3:
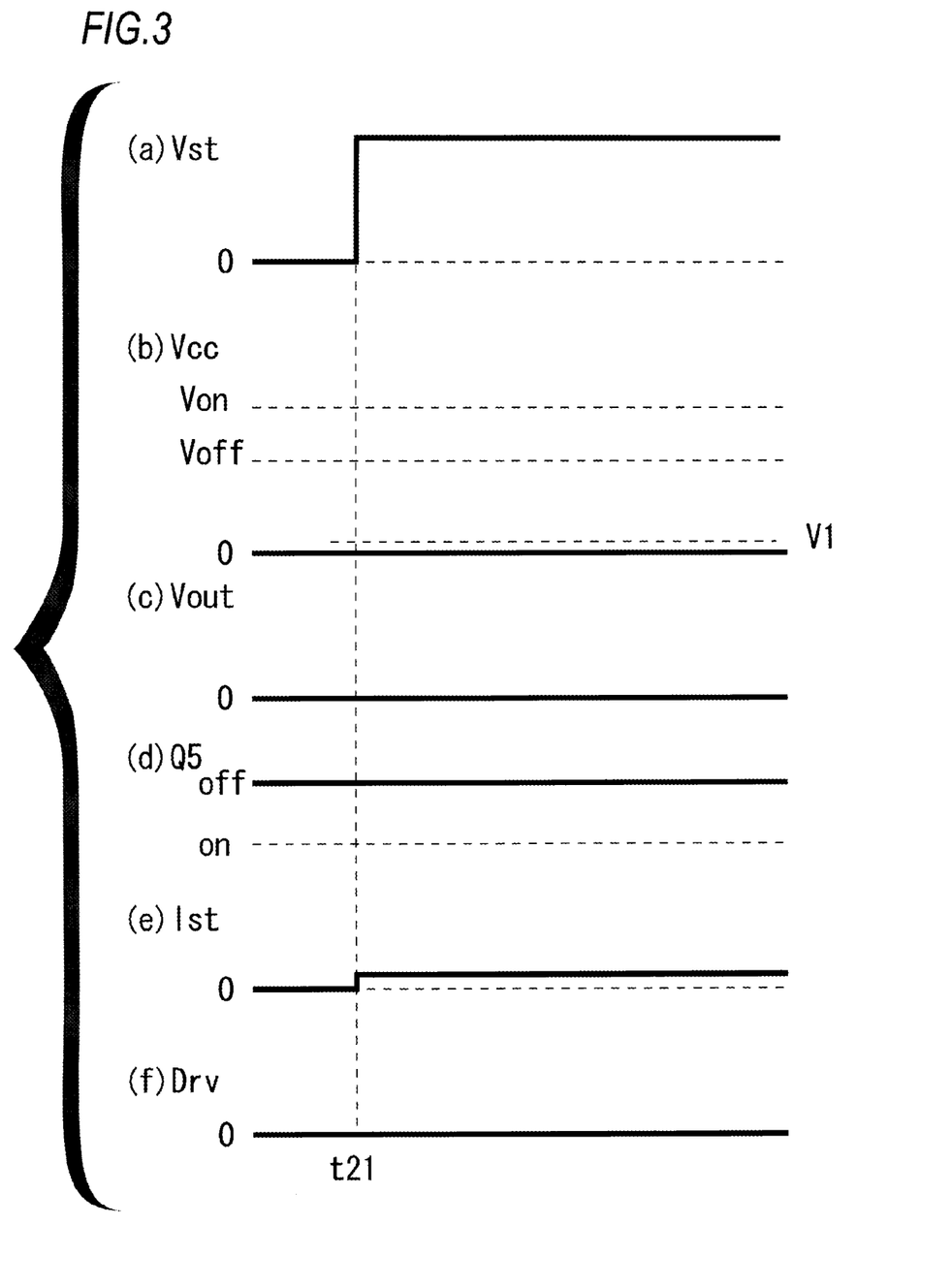
FIG. 3 is a waveform diagram illustrating signal waveforms and operation waveforms (a) to (f) of each part in a state of a short circuit between a ground terminal GND and a power input terminal VCC of a control circuit shown in FIG. 1.

FIG. 3 illustrates the signal waveforms and operation waveforms (a) to (f) with respect to respective parts of FIG. 1 in the state where the circuit is shorted between the power input terminal VCC of the control circuit 3a and the ground terminal GND. The waveform (a) illustrates the input voltage Vst, the waveform (b) illustrates the control voltage Vcc, the waveform (c) illustrates the output voltage Vout, the waveform (d) illustrates on-and-off state of the transistor Q5, the waveform (e) illustrates the starting current Ist, and the waveform (f) illustrates a driving signal Drv, respectively.

In the state where the circuit is shorted between the power input terminal VCC of the control circuit 3a and the ground terminal GND, when the DC power source E is turned on at time point t21, the input voltage Vst to the resistor R1 from the DC power source E is increased. Since the source voltage of the MOSFET Q1 is applied to the gate of MOSFET Q4 via the resistor R6 and thereby the MOSFET Q4 is turned on, the first constant current Ia begins to flow as the starting current Ist. However, since the circuit is shorted between the power input terminal VCC of the control circuit 3a and the ground terminal GND, the power-supply voltage Vcc does not reach the threshold voltage V1, the MOSFET Q4 is maintained in the ON-state, and the constant current Ia smaller than the second constant current Ib continues to flow as it is. Thus, a loss in the starting circuit 1a can be suppressed due to the DC power source E×the first constant current Ist, and thereby the thermal destruction of the starting circuit 1a can be suppressed.

Figure 8:
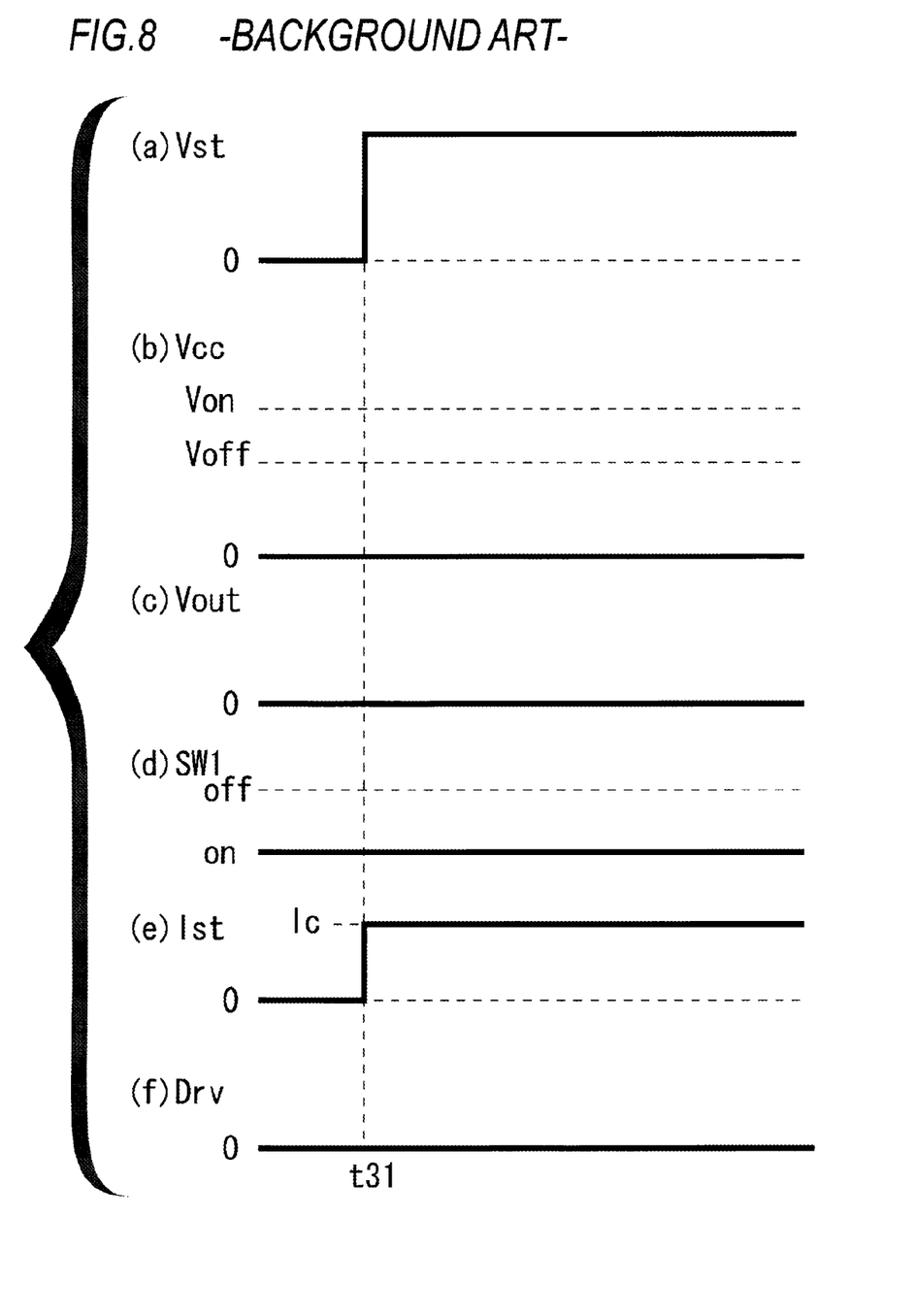
FIG. 8 is a waveform diagram illustrating signal waveforms and operation waveforms (a) to (f) of each part in a state of a short circuit between the ground terminal GND and the power input terminal VCC of the control circuit shown in FIG. 6.

Meanwhile, FIG. 8 illustrates the signal waveforms and operation wave forms (a) to (f) with respect to respective parts of FIG. 1 in the state where the circuit is shorted between the power input terminal VCC of the control circuit 3 and the ground terminal GND in the background switching power-supply apparatus. The waveform (a) illustrates the input voltage Vst, the waveform (b) illustrates the control voltage Vcc, the waveform (c) illustrates the output voltage Vout, the waveform (d) illustrates on-and-off state of the switch SW1, the waveform (e) illustrates the starting current Ist, and the waveform (f) illustrates the drive signal Drv, respectively.

In the background switching power-supply apparatus shown in FIG. 6, in the state where the circuit is shorted between the power input terminal VCC of the control circuit 3 and the ground terminal GND, when the DC power source E is turned on at time point t31, in the starting circuit 1, the input voltage Vst is applied to the constant current circuit CC1 through the resistor R1, and the predetermined constant current Ic (2.5 mA, for example) flows as the starting current Ist by the constant current circuit CC1. Here, since the circuit between the power input terminal VCC of the control circuit 3 and the ground terminal GND is short-circuited, the capacitor C10 is not charged, and accordingly the power-supply voltage Vcc remains as 0V without increasing. Therefore, the constant current Ic continues to flow from the constant current circuit CC1, and a loss in the starting circuit 1 becomes the voltage Vst of the DC power source E×the constant current Ic, so that the heat generation becomes larger. Thus, the loss in the starting circuit 1 and the switching element Q10 increase, and it may destroy the elements.

As described above, according to the first illustrative embodiment, the switching power-supply apparatus includes the switching element Q10 which is connected to the DC power source E via the primary winding P1 of the transformer T, the control circuit 3a controlling the on-and-off switching of the switching element Q10, the first rectifying-and-smoothing circuit (diode D11, capacitor C11) rectifying-and-smoothing a voltage generated in the secondary winding S1 of the transformer T to thereby supply it to the load, and the second rectifying-and-smoothing circuit (diode D10, capacitor C10) rectifying-and-smoothing a voltage generated in the tertiary winding P2 of the transformer T to thereby supply it to the control circuit 3a as the power-supply voltage Vcc. The switching power-supply apparatus includes the starting circuit 1a that supplies: the first constant current Ia to the control circuit 3a when the power-supply voltage Vcc is equal to or lower than the first threshold voltage V1, which is lower than the starting voltage Von (stop voltage Voff) of the control circuit 3a, as the starting current Ist, the second constant current Ib greater than the first constant current Ia to the control circuit 3a when the power-supply voltage Vcc is larger than the first threshold voltage V1 and is equal to or lower than the starting voltage Von, as the starting current Ist, and the first constant current Ia to the control circuit 3a while the control circuit 3a is started up, as the starting current Ist. According to this configuration, since the first constant current Ia is supplied to the control circuit 3a even when the power-supply voltage Vcc is larger than the starting voltage Von of the control circuit 3a, it is possible to suppress the reduction in the power-supply voltage Vcc until the voltage generated in the tertiary winding P2 of the transformer T increases up to the operating voltage, after starting of the control circuit 3a. Accordingly, it is possible to obtain a stable operating voltage, and even if the capacitor C10 for charging of the power-supply voltage Vcc has a small capacity, it is possible to suppress the start-up failure.

Further, according to the first illustrative embodiment, when the DC power source E is turned on, if the first power-supply voltage Vcc is equal to or lower than the first threshold voltage V1, the loss in the starting circuit 1a is small because the starting circuit 1a supplies the first constant current Ia. Further, in case that the power-supply voltage Vcc is larger than the first threshold voltage V1, it is possible to speed up the starting of the control circuit 3a since the second constant current Ib greater than the first constant current Ia is supplied to the control circuit 3a.

Further, according to the first illustrative embodiment, since it is determined whether the power-supply voltage Vcc is larger than the first threshold voltage V1 and then the starting current of the first constant current Ia or the second constant current Ib is selected, a thermal destruction in the starting circuit 1a would not occur even when the circuit between the power input terminal VCC of the control circuit 3a and the ground terminal GND is short-circuited.

Further, according to the first illustrative embodiment, even when the operation of the switching power supply is stopped by on-and-off control due to an external control signal (not shown), or by abnormality such as an overvoltage of the output voltage, since the starting circuit 1a supplies the first constant current Ia to the control circuit 3a, it is possible to suppress a drop in the power-supply voltage Vcc, and it is thereby possible to stably maintain the stopped state.

Furthermore, according to the first illustrative embodiment, when it is in a normal operation state after the starting, since the starting circuit 1a supplies the constant current Ia to the control circuit 3a, the switching operation becomes an intermittent oscillation operation in the case where the load 5 has no load or light load, and even if the charging current to the capacitor C10 from the tertiary winding P2 of the transformer T is insufficient, the power-supply voltage Vcc of the control circuit 3a can be compensated.

Second Illustrative Embodiment

Figure 4:
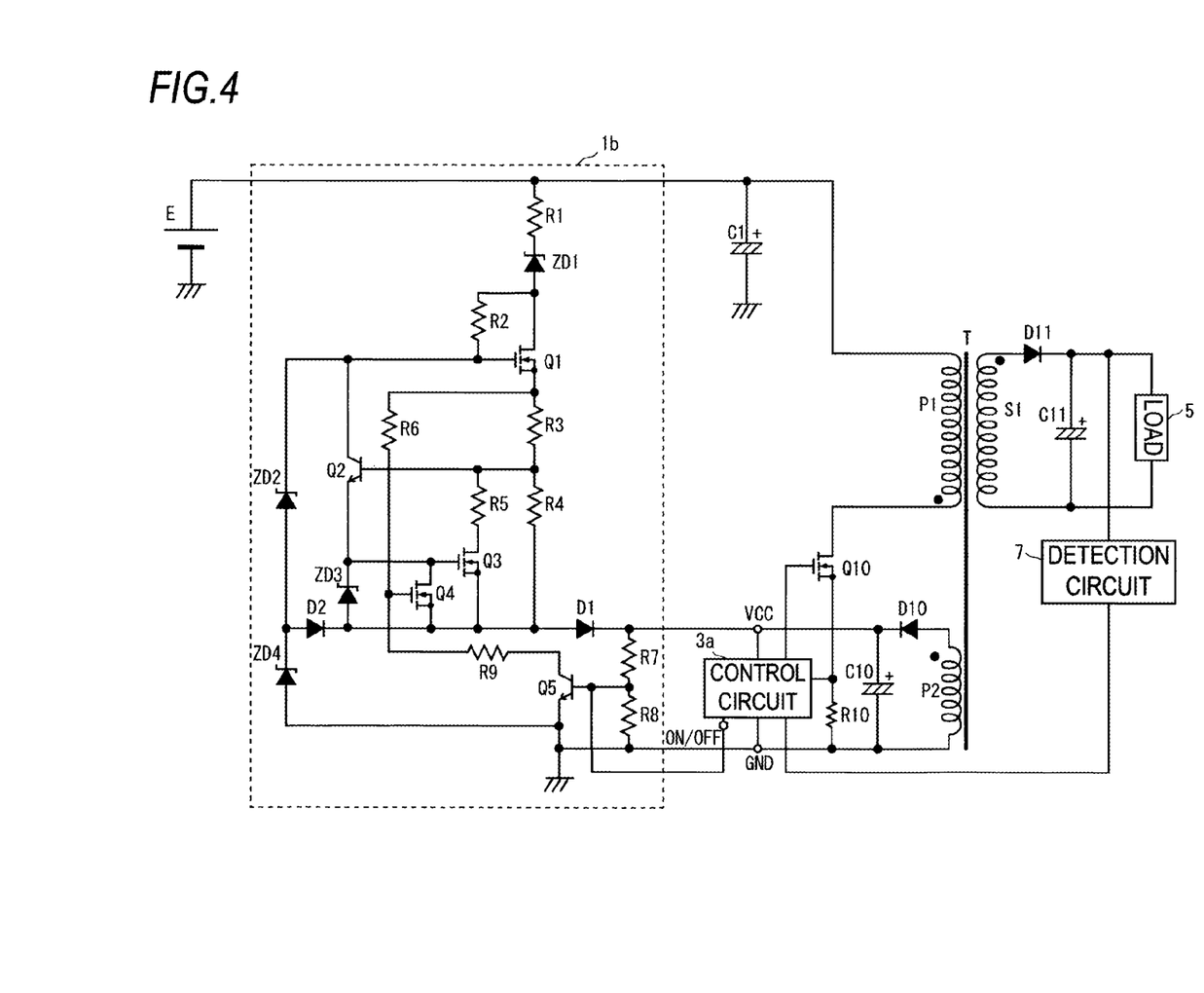
FIG. 4 is a circuit diagram illustrating a circuit configuration of a switching power-supply apparatus according to a second illustrative embodiment of this disclosure.

Referring to FIG. 4, in addition to the configuration of the starting circuit 1a of the switching power-supply apparatus according to the first illustrative embodiment, the starting circuit 1b of the switching power-supply apparatus according to the second illustrative embodiment is provided with a diode D2 and a Zener diode ZD4. The diode D2 is connected in series with the Zener diode ZD2 and is connected between the anode of the diode D1 and the anode of the Zener diode ZD2. The Zener diode ZD4 is connected between the connection point of the anode of the Zener diode ZD2 with the anode of the diode D2 and the ground terminal GND of the control circuit 3a. Also, the Zener voltage VZ4 of the Zener diode ZD4 is set as a voltage higher than the starting voltage Von (18V, for example) of the control circuit 3a, and it functions as the second threshold voltage V2.

Figure 5:
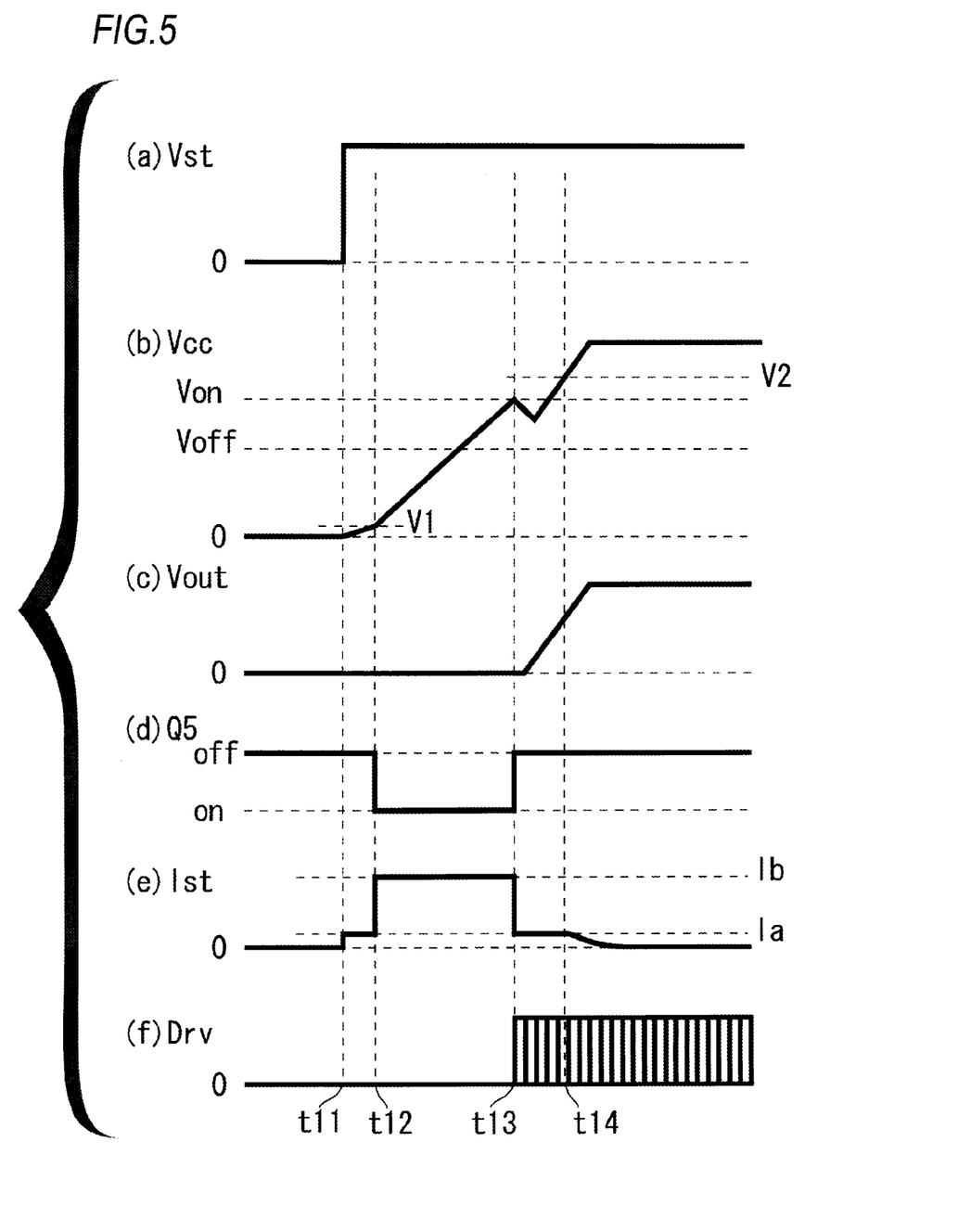
FIG. 5 is a waveform diagram illustrating signal waveforms and operation waveforms (a) to (f) with respect to respective parts of the FIG. 4.

As shown in FIG. 5, according to the diode D2 and the Zener diode ZD4, when the power-supply voltage Vcc is larger than the second threshold voltage V2 at time point t14, the current value of the first constant current Ia decreases as the power-supply voltage Vcc increases. This is because the gate voltage of MOSFET Q1 is clamped to the series Zener voltage (VZ2+VZ4) between the Zener diodes ZD2 and ZD4.

The voltage between the source of MOSFET Q1 and the anode of the diode D1 is expressed as the first constant current Ia flowing through the resistor R3, the series Zener voltage (VZ2+VZ4) by the Zener diodes ZD2 and ZD4 is to be as follows.

$$VZ2+VZ4=Vcc+VFD1+VBE2+R3 \times Ib+Vgs1$$

Here, the voltage VFD1 is a forward voltage of the diode D1, the voltage VBE2 is a voltage between the base and emitter of the transistor Q2, and the voltage Vgs1 is a voltage between the gate and source of MOSFET Q1.

Thus, the first constant current Ia is to be as follows.

$$Ia=(VZ2+VZ4-(V3+VFD1+VBE2+Vgs1))/R3$$

According to the above, a relationship equation indicates that the first constant current decreases depending on the magnitude of the power-supply voltage Vcc.

As described above, according to the second illustrative embodiment, the starting circuit 1b is configured to reduce the first constant current Ia as the power-supply voltage Vcc increases, when the power-supply voltage Vcc is larger than the second threshold voltage V2 of higher than the starting voltage Von of the control circuit 3a. According to this configuration, it is possible to reduce the power consumption of the starting circuit 1b. Further, in the case where the power-supply voltage Vcc is maintained to be larger than the stop voltage Voff when the switching power supply is stopped and so on, as the second threshold voltage V2 the power-supply voltage Vcc of the control circuit 3a is higher, the current from the starter circuit 1b is smaller.

In the foregoing, this disclosure has been described according to the specific illustrative embodiments, but this disclosure can be modified within the spirit and scope of this disclosure.

For example, in the first illustrative embodiment, it is provided with a comparator circuit for comparing the power-supply voltage Vcc with a threshold voltage higher than the starting voltage Von of the control circuit 3a, and when the power-supply voltage Vcc is larger than the threshold voltage greater than the starting voltage Von of the control circuit 3a, it is configured to cut off the first constant current Ia, based on the output of the comparator circuit.

What is claimed is:

1. A switching power-supply apparatus, comprising:
   a switching element that is configured to be connected to a DC power source via a primary winding of a transformer;
   a control circuit that controls on-and-off switching of the switching element;
   a first rectifying-and-smoothing circuit that rectifies and smoothes a voltage generated in a secondary winding of the transformer and supplies it to a load; and
   a second rectifying-and-smoothing circuit that rectifies and smoothes a voltage generated in a tertiary winding of the transformer and supplies it to the control circuit as a power supply voltage,
   a starting circuit that supplies as a starting current:
      a first constant current to the control circuit when the power supply voltage is equal to or lower than a first threshold voltage, the first threshold voltage being lower than a starting voltage of the control circuit;
      a second constant current, which is greater than the first constant current, to the control circuit when the power supply voltage is larger than the first threshold voltage and is equal to or lower than the starting voltage; and
      the first constant current to the control circuit while the control circuit is started up.

2. The switching power-supply apparatus according to claim 1, wherein the first threshold voltage is set to be lower than a stop voltage of the control circuit.

3. The switching power-supply apparatus according to claim 1, wherein when the power supply voltage is larger than a second threshold voltage higher than a starting voltage of the control circuit, the starting circuit reduces the first constant current as the power supply voltage increases.

4. A starting circuit provided in a switching power-supply apparatus and supplying a starting current to a control circuit when a DC power source is turned on, the starting circuit comprising a switching element that is configured to be connected to a DC power source via a primary winding of a transformer; a control circuit that controls on-and-off switching of the switching element; a first rectifying-and-smoothing circuit that rectifies and smoothes a voltage generated in a secondary winding of the transformer and supplies it to a load; and a second rectifying-and-smoothing circuit that rectifies and smoothes a voltage generated in a tertiary winding of the transformer and supplies it to the control circuit as a power supply voltage,
   wherein the starting circuit supplies as a starting current:
      a first constant current to the control circuit when the power supply voltage is equal to or lower than a first threshold voltage, the first threshold voltage being lower than a starting voltage of the control circuit;
      a second constant current, which is greater than the first constant current, to the control circuit when the power supply voltage is larger than the first threshold voltage and is equal to or lower than the starting voltage; and
      the first constant current to the control circuit while the control circuit is started up.

* * * * *